(12) United States Patent
Slobodecki et al.

(10) Patent No.: US 7,086,125 B2
(45) Date of Patent: Aug. 8, 2006

(54) MULTIPLE STAGE ASSEMBLY ASSIST FASTENER

(75) Inventors: Jeffrey A Slobodecki, Wales, MI (US); Jacob A Siudym, II, Emmett, MI (US)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 10/831,500

(22) Filed: Apr. 23, 2004

(65) Prior Publication Data

US 2005/0236861 A1    Oct. 27, 2005

(51) Int. Cl.
*F16B 5/06* (2006.01)
*F16B 2/24* (2006.01)

(52) U.S. Cl. .......................................... 24/295; 24/293

(58) Field of Classification Search ................ 24/297, 24/295, 294, 293; 411/172, 182, 112
See application file for complete search history.

(56) References Cited

U.S. PATENT DOCUMENTS

| | | | | |
|---|---|---|---|---|
| 2,414,986 A | * | 1/1947 | Tinnerman | .................. 24/293 |
| 3,411,190 A | * | 11/1968 | Augier | ........................ 24/293 |
| 3,486,158 A | * | 12/1969 | Soltysik et al. | ............. 411/510 |
| 3,673,643 A | | 7/1972 | Kindell | |
| 5,249,900 A | * | 10/1993 | Mitts | ......................... 411/182 |
| 5,759,004 A | * | 6/1998 | Kuffel | ......................... 411/508 |
| 5,887,319 A | | 3/1999 | Smith | |
| 5,917,701 A | * | 6/1999 | Solberg | ...................... 361/704 |
| 5,919,019 A | | 7/1999 | Fischer | |
| 6,101,686 A | | 8/2000 | Velthoven et al. | |
| 6,141,837 A | | 11/2000 | Wisniewski | |
| 6,353,981 B1 | | 3/2002 | Smith | |
| 6,406,236 B1 | | 6/2002 | Olson, Jr. | |
| 6,481,682 B1 | * | 11/2002 | Miura | ........................ 24/297 |
| 6,560,819 B1 | | 5/2003 | Mizuno et al. | |
| 6,606,766 B1 | * | 8/2003 | Ko | ............................... 24/295 |
| 6,629,809 B1 | * | 10/2003 | Vassiliou | .................... 411/173 |
| 6,691,380 B1 | | 2/2004 | Vassiliou | |
| 6,718,599 B1 | | 4/2004 | Dickinson et al. | |
| 2001/0032377 A1 | | 10/2001 | Lubera et al. | |
| 2001/0046426 A1 | | 11/2001 | Lubera et al. | |
| 2002/0007537 A1 | | 1/2002 | Lubera et al. | |
| 2003/0053884 A1 | | 3/2003 | Dickinson et al. | |
| 2004/0040124 A1 | | 3/2004 | Lubera et al. | |

* cited by examiner

*Primary Examiner*—Robert J. Sandy
(74) *Attorney, Agent, or Firm*—Harness, Dickey & Pierce, P.L.C.

(57) ABSTRACT

A fastener joining an object to a panel includes a fastener plate nonrotatably receiving the object. Elastically displaceable elements, each having multiple concave shaped detents alternately engage a panel mounting aperture when the displaceable elements are inserted into the mounting aperture. Multiple retention positions are provided by the multiple detents.

18 Claims, 5 Drawing Sheets

MULTIPLE STAGE ASSEMBLY ASSIST FASTENER

FIELD OF THE INVENTION

The present invention relates generally to resilient clip fasteners and more particularly to a resilient clip fastener that employs a particular surface geometry to secure the body portion of the resilient clip to a structure.

BACKGROUND OF THE INVENTION

Many current vehicles employ resilient clips to secure various components to an automobile vehicle body. One such application concerns instrument panels that mount to the interior of the vehicle. Such panels provide one or more instruments together with instrument wiring harnesses or system connections.

During assembly of the vehicle, it is a conventional procedure to install the entire panel assembly onto the interior of the vehicle in a single operation. In other words, the panel assembly is passed through either the windshield or backlight opening of the vehicle body on the assembly line and then the panel assembly is secured by line operators to the interior of the vehicle.

In order to accomplish this assembly task, the panel assembly is commonly equipped with two or more fasteners located around the periphery of the panel assembly, as well as at predetermined locations around the interior area of the panel, that are adapted to penetrate through corresponding apertures located in the reinforcing sheet metal members of the vehicle interior. It is the responsibility of the line operators to properly orient the panel assembly adjacent the interior of the vehicle and press the fasteners into the various mounting holes in the reinforcing sheet metal members to secure the panel assembly to the interior of the vehicle.

For panels such as instrument panels, the components and therefore the structure of the panel can have significant weight. In addition, common instrument panels provide a layer of foam or other sound/vibration damping material on a back side (opposite to a passenger facing side) of the panel. When conventional resilient clips are used, the line operator must align each resilient clip with a corresponding mounting aperture and press on the panel with one hand adjacent the resilient clip with sufficient force to compress the layer of foam while maintaining resilient clip alignment with the mounting aperture. With a second hand the line operator must simultaneously hold and operate a fastener tool to insert a screw to complete the installation. This procedure is time consuming and can often require several attempts and/or several operators.

SUMMARY OF THE INVENTION

According to one aspect of a multiple stage assist fastener of the present invention, a fastener used to join an object to a panel includes a fastener plate nonrotatably receiving the object. Elastically displaceable elements, each having multiple concave shaped detents alternately engage a panel mounting aperture when the displaceable elements are inserted into the mounting aperture. Multiple retention positions are provided by the multiple detents.

According to another aspect of the present invention, the fastener includes a base plate having first and second sides. In a further aspect of the present invention, a first substantially U-shaped deflectable wing depends from the first side of the base plate and a second substantially U-shaped deflectable wing depends from the first side of the base plate and is positioned substantially parallel to the first deflectable wing. In yet another aspect of the present invention, detents are formed on the first deflectable wing and also on the second deflectable wing oppositely facing the detents of the first wing.

In still another aspect of the present invention, a method for creating a multiple wing retaining fastener, the fastener including a plurality of deflectable wings and a threaded fastener receiving aperture, is provided. Still another aspect of the present invention provides a method for joining at least two component parts using a multiple deflectable wing clip.

A multiple stage assembly assist fastener of the present invention offers several advantages over conventional devices. The fastener of the present invention provides a relatively low installation force and a relatively high removal force. The fastener accommodates additional panel thickness due to foam or sound/vibration damping material. The fastener is inexpensive to manufacture, reliable and simple to install. Furthermore, the fastener of the present invention is particularly adapted for securing items to one another in a manner permitting a structure such as a panel to be temporarily mounted to a vehicle promoting a hands-free use of a fastener engagement tool to complete the panel installation. The features, functions, and advantages can be achieved independently in various embodiments of the present invention or may be combined in yet other embodiments.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The following description of the preferred embodiment is merely exemplary in nature and is in no way intended to limit the invention, its application, or uses.

Figure 1:
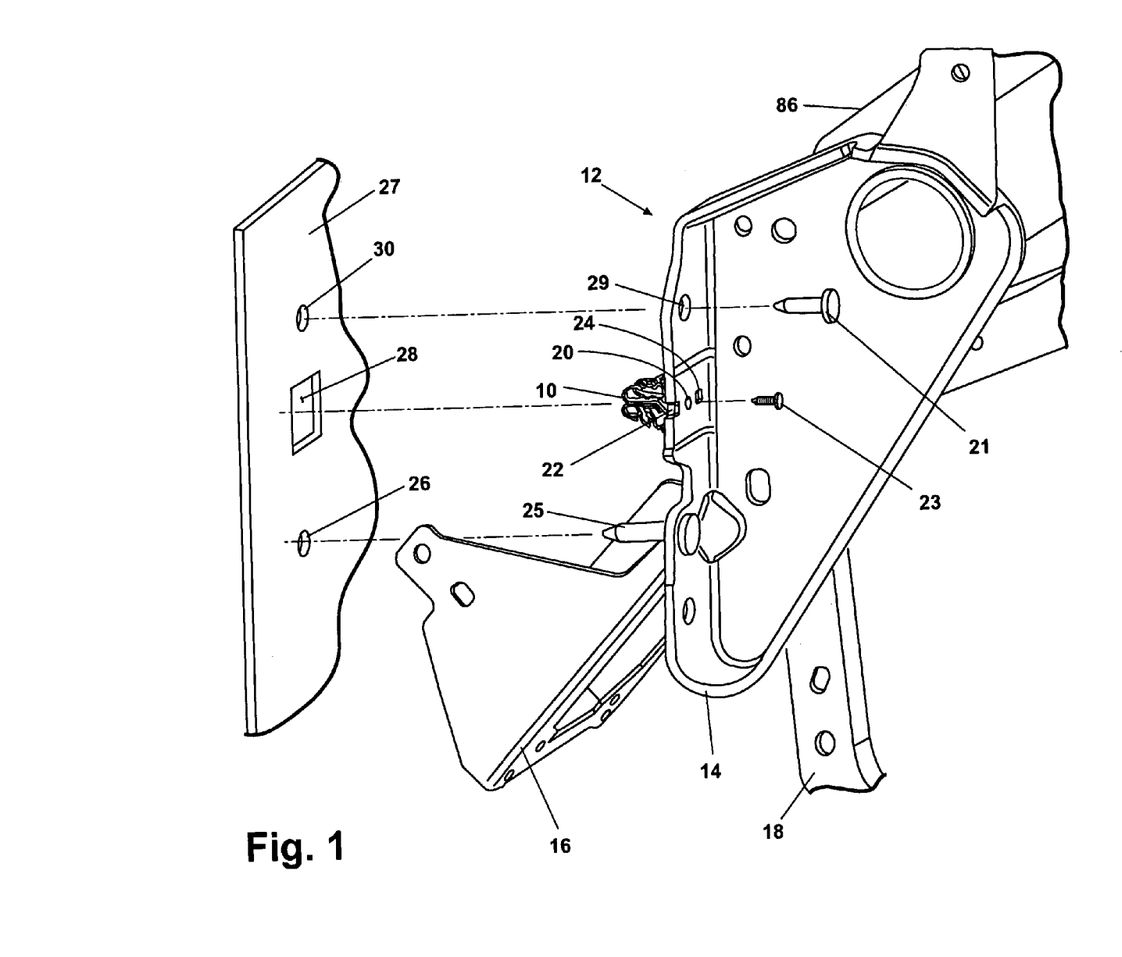
FIG. 1 is an exploded, perspective view showing a preferred embodiment of a multiple stage assembly assist fastener of the present invention mounted to structure of an instrument panel.

According to a preferred embodiment of the present invention and referring to FIG. 1, a resilient fastener 10 is connected to an installation assembly 12. Installation assembly 12 generally represents a structural configuration used to support, for example, an instrument panel, for installation in an automobile vehicle. Installation assembly 12 includes a plurality of metal mounting brackets 14, a plurality of metal support brackets 16, and one or more metal structural members 18. Resilient fastener 10 is attached to mounting bracket 14 adjacent a retainer mounting aperture 20 provided through mounting bracket 14. Retainer mounting aperture 20 is co-aligned with an engagement aperture 36 (described in greater detail with reference to FIG. 2) which together receive a mechanical fastener 23 preferably being a screw, or alternately a rivet, a bolt or a similar fastener known in the art to fastenably connect resilient fastener 10 to mounting bracket 14.

Resilient fastener 10 includes a pair of tabs 22, although one or more that two can alternately be used, which engage within corresponding tab receiving apertures 24 also provided by mounting bracket 14. The purpose for tabs 22 is to provide an anti-rotation feature for resilient fastener 10. Installation assembly 12 also includes a locating pin 25 positioned adjacent to each fastener 10. Locating pin 25 is visually aligned with an alignment aperture 26 formed in a vehicle body panel 27. When locating pin 25 is aligned with alignment aperture 26, resilient fastener 10 is aligned with a fastener engagement aperture 28, also provided in vehicle panel 27. A mechanical fastener 21, preferably a screw, but alternately a rivet, a bolt or similar device is inserted through a clearance aperture 29 created in mounting bracket 14 to engage within a fastener receiving aperture 30 of vehicle body panel 27 to fully seat resilient fastener 10 within fastener engagement aperture 28.

Figure 2:
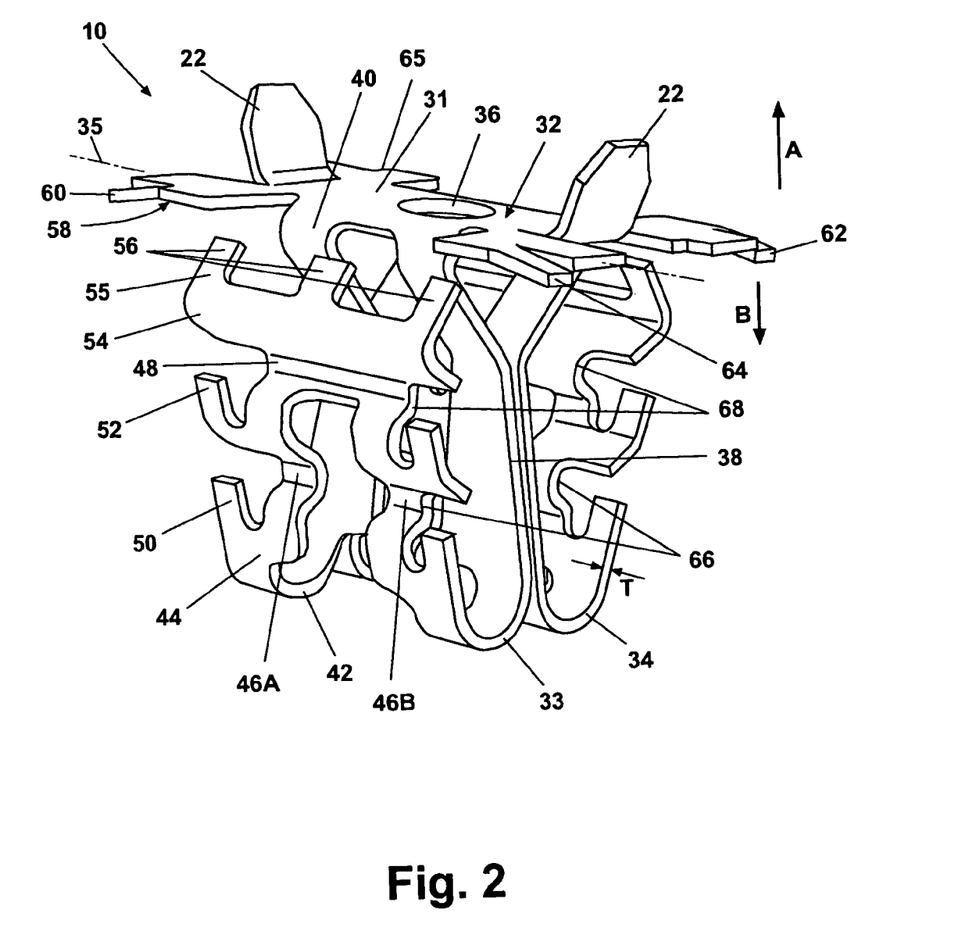
FIG. 2 is a perspective view of the fastener of FIG. 1.

Referring now to FIG. 2, resilient fastener 10 further includes a fastener plate 31 having a plate first surface 32. A U-shaped member 33 and a U-shaped member 34 both depend or otherwise extend from fastener plate 31 opposite to plate first surface 32 and are substantially perpendicular to a plane 35 of fastener plate 31. Each of tabs 22 extend in a direction "A" from the plate first surface 32 of fastener plate 31. Engagement aperture 36 is approximately centrally located on fastener plate 31. Engagement aperture 36 includes screw threads or a similar fastener engagement surface to matingly engage mechanical fastener 23 which as previously discussed is provided to connectably engage fastener plate 31 with mounting bracket 14 (shown in FIG. 1).

Each of U-shaped members 33, 34 further includes a support leg 38 integrally connected at a connection end 40 to fastener plate 31. Connection end 40 is bifurcated and a U-shaped distal end 42 connects each support leg 38 to a detent portion 44. Each detent portion 44 also includes a first detent 46 and a second detent 48. Second detent 48 is located adjacent a closed junction of the bifurcated portion of detent portion 44. Each first detent 46 and second detent 48 define a substantially concave shaped arc created using a full thickness "T" of U-shaped members 33, 34, with the concave shaped arc facing away from support leg 38 and engagement aperture 36. In a preferred embodiment, a pair of stop members 50 positioned adjacent first detent 46, and a pair of stop members 52 positioned adjacent second detent 48 are provided. Alternately, one stop member 50 and one stop member 52, or a plurality of stop members 50, 52 are used. A convex arcuate section 54 extends upwardly as viewed in FIG. 2 above second detent 48. Convex arcuate section 54 provides a convex shaped curve facing the same direction as each of the concave shaped curves of first detent 46 and second detent 48, respectively. A free end 55 is positioned adjacent convex arcuate section 54. In a preferred embodiment, free end 55 includes three contact members 56. Alternately, one, two or more than three contact members 56 can be used.

Each of contact members 56 are spatially separated from a plate second surface 58 of fastener plate 31. Plate second surface 58 opposes plate first surface 32. A plurality of compression elements 60, 62, and 64 are created by partially shearing or separating a portion of fastener plate 31 in a direction "B", such that each compression element 60, 62, and 64 extends below a plane through fastener plate 31. A fourth compression element 65 (not completely visible in FIG. 2) which is similar to each of compression elements 60, 62, and 64 is also provided.

U-shaped members 33 and 34 generally oppose each other and substantially create a mirror image configuration of each other. Opposed first detents 46 of each of U-shaped member 33 and U-shaped member 34 create a detent first pair 66. Similarly a detent second pair 68 is created using opposing ones of second detents 48 of U-shaped member 33 and U-shaped member 34, respectively. Each of U-shaped members 33 and 34 are preferably bifurcated such that each first detent 46 is divided into a first detent portion 46A and a second detent portion 46B. Second detent 48 and any further detents are also similarly subdivided. Alternately, U-shaped members 33 and 34 are continuous in lieu of bifurcated.

Figure 3:
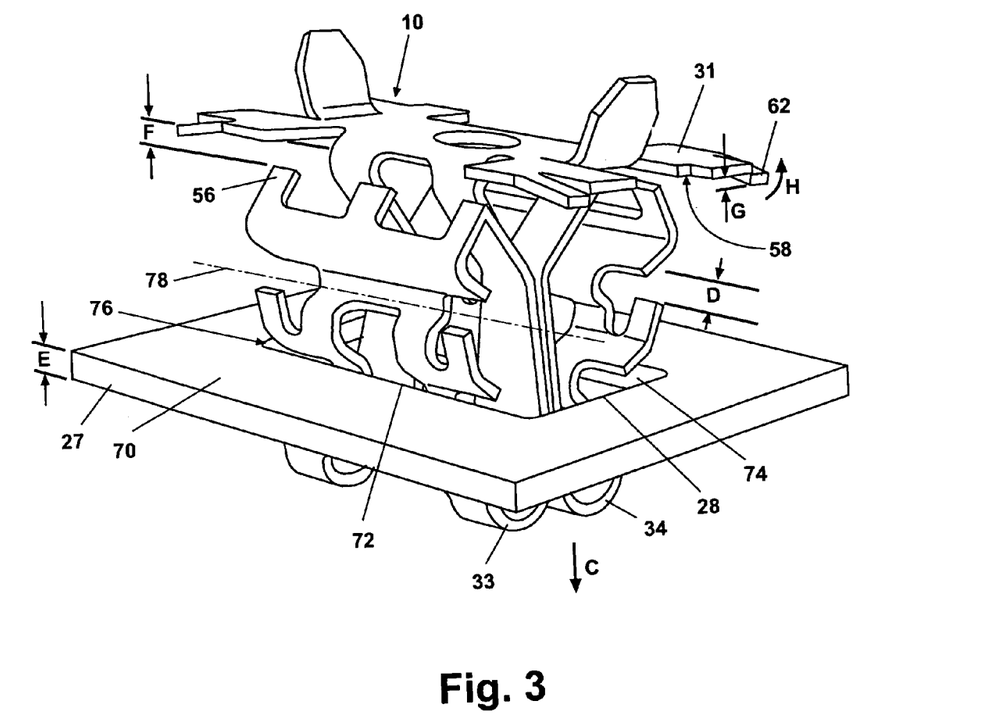
FIG. 3 is a perspective view of the fastener of FIG. 1 shown in a first temporary retention position engaged with a vehicle body panel.

With reference to FIGS. 2 and 3, each of U-shaped member 33 and U-shaped member 34 are shown partially inserted within fastener engagement aperture 28 of vehicle body panel 27. A majority of resilient fastener 10 is disposed towards a body panel first side 70 of vehicle body 27. The detents of detent first pair 66 are biased into engagement with each of a first boundary portion 72 and a second boundary portion 74, respectively, of fastener engagement aperture 28. Elastic deflection of U-shaped member 33 and U-shaped member 34 provides the biasing force for engagement. Upon insertion in installation direction "C" into fastener engagement aperture 28, each contact member 56 of free end 55 is deflected toward connection end 40 of each U-shaped member 33 and 34, respectively. In the position shown in FIG. 3, a first temporary retention position 76 is defined when vehicle body panel 27 is held within detent first pair 66. By further pressing resilient fastener 10 in installation direction "C", both U-shaped member 33 and U-shaped member 34 elastically deflect towards each other, and detent first pair 66 disengages from engagement aperture 28, allowing further insertion of U-shaped member 33 and U-shaped member 34 until first and second boundary portions 72 and 74 of fastener engagement aperture 28 are engaged by detent second pair 68. A second temporary retention position 78 is defined when first and second boundary portions 72 and 74 of fastener engagement aperture 28 are engaged by detent second pair 68.

A separation distance "D" is maintained between stop members 52 and convex arcuate section 54. Separation distance "D" is approximately equal to a plate thickness "E" of vehicle body panel 27. Each contact member 56 is spatially separated from plate second surface 58 by a clearance dimension "F" in a non-deflected condition of U-shaped member 33 and U-shaped member 34. Clearance dimension "F" is also approximately equal to plate thickness "E". An exemplary compression distance "G" is provided between compression element 62 and plate second surface 58. Each of compression elements 60, 62, 64, and 65 are provided with an approximately equivalent compression distance "G". Each compression element 60, 62, 64, and 65 elastically deflects about a rotation arc "H" up to the complete value of compression distance "G".

Figure 4:
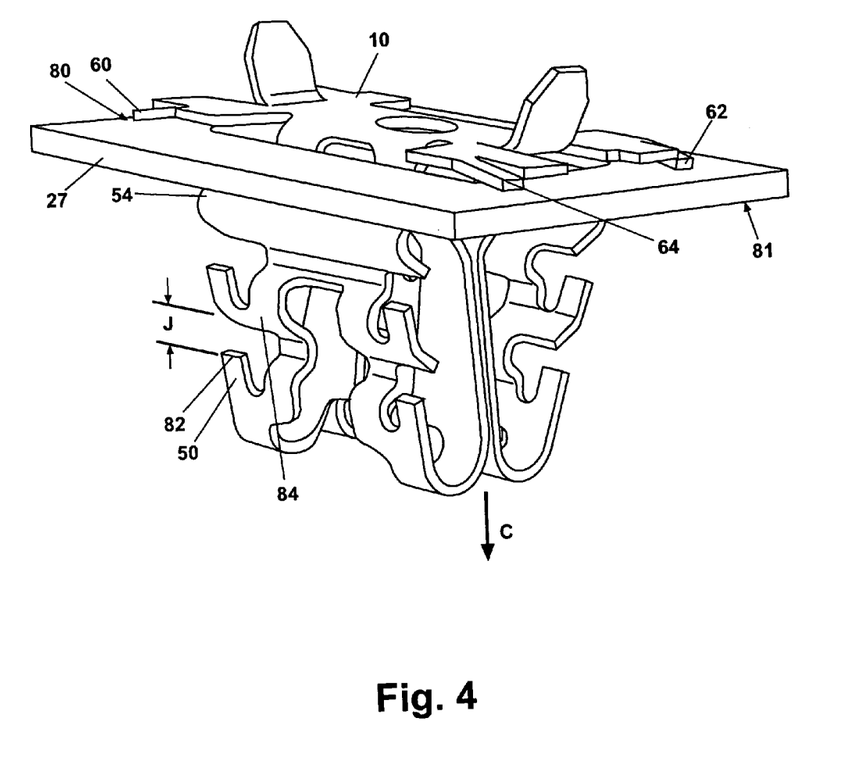
FIG. 4 is a perspective view similar to FIG. 3 showing a final retention position between the vehicle panel and the fastener of FIG. 1.

Referring now to FIG. 4, a final retention position 80 of vehicle body panel 27 is defined when vehicle body panel 27 is located between convex arcuate sections 54 of each of U-shaped members 33 and 34 and each of compression elements 60, 62, 64, and 65. The final retention position 80 is achieved by completely inserting each of U-shaped members 33 and 34 through fastener engagement aperture 28 in the installation direction "C". Compression distance "G" permits resilient fastener 10 to seat in the final retention position 80 while allowing for a construction tolerance of resilient fastener 10 as well as a thickness tolerance of plate thickness "E". In the final retention position 80, contact members 56 contact a surface 81 of vehicle body panel 27. Alternately, distal ends of each contact member 56 are partially inserted through fastener engagement aperture 28 such that distal ends of contact member 56 engage one of first boundary portions 72 or second boundary portions 74 of fastener engagement aperture 28. A distal end 82 of each stop member 50 is separated by a clearance distance "J" from a contact surface 84 creating there-between first detent 46.

In each of first temporary retention position 76, second temporary retention position 78, and final retention position 80, resilient fastener 10 provides a pullout force of at least 9.07 kg (20 lb). The pullout force of fastener 10 ranges from approximately 9.07 kg (20 lb) up to approximately 68.04 kg (150 lbs). The pullout force is defined as the force required to disengage or displace U-shaped member 33 and U-shaped member 34 from one of the retention positions. Stop members 50 and 52 resist pullout of resilient fastener 10 from fastener engagement aperture 28. In a preferred embodiment, stop members 50 and 52 positively engage surface 81 of vehicle body panel 27 preventing pullout of resilient fastener 10 unless each of U-shaped member 33 and U-shaped member 34 are first compressed toward each other. An insertion force for resilient fastener 10 is a fraction of the pullout force, for example approximately 8.16 kg (18 lbs) or less for a spring steel resilient fastener 10.

A resilient fastener of the present invention is preferably formed of a spring steel such as 1050 steel. Alternate materials can include other metals, metal alloys, polymeric materials, and/or composite materials. The pullout force provided by resilient fastener 10 can vary depending upon the type of material chosen. The exemplary pullout force range identified herein applies to 1050 spring steel material.

Referring generally back to FIG. 1, installation assembly 12 for an automotive vehicle (or the attached instrument panel) further includes a layer of acoustic attenuation material or foam, referred to hereinafter as foam 86. When the operator attempts to install installation assembly 12 into the vehicle using a conventional clip fastener, the foam 86 must be compressed, which adds to the complexity of aligning installation assembly 12. By providing multiple retention positions with resilient fastener 10 of the present invention, multiple temporary installation positions (or engagement points) between resilient fastener 10 and vehicle body panel 27 are provided, which permit temporary installation of installation assembly 12 without requiring full compression of foam 86. This permits the operator to temporarily support installation assembly 12 (including any attached instruments or instrument panels) with sufficient retention force to allow the operator to release installation assembly 12 and complete installation of fasteners 21 necessary to achieve the final retention position 80 shown in FIG. 4. Each of first temporary position 76 and second temporary position 78 provide approximately equivalent pullout force for resilient fastener 10 to permit the temporary installation of installation assembly 12.

Figure 5:
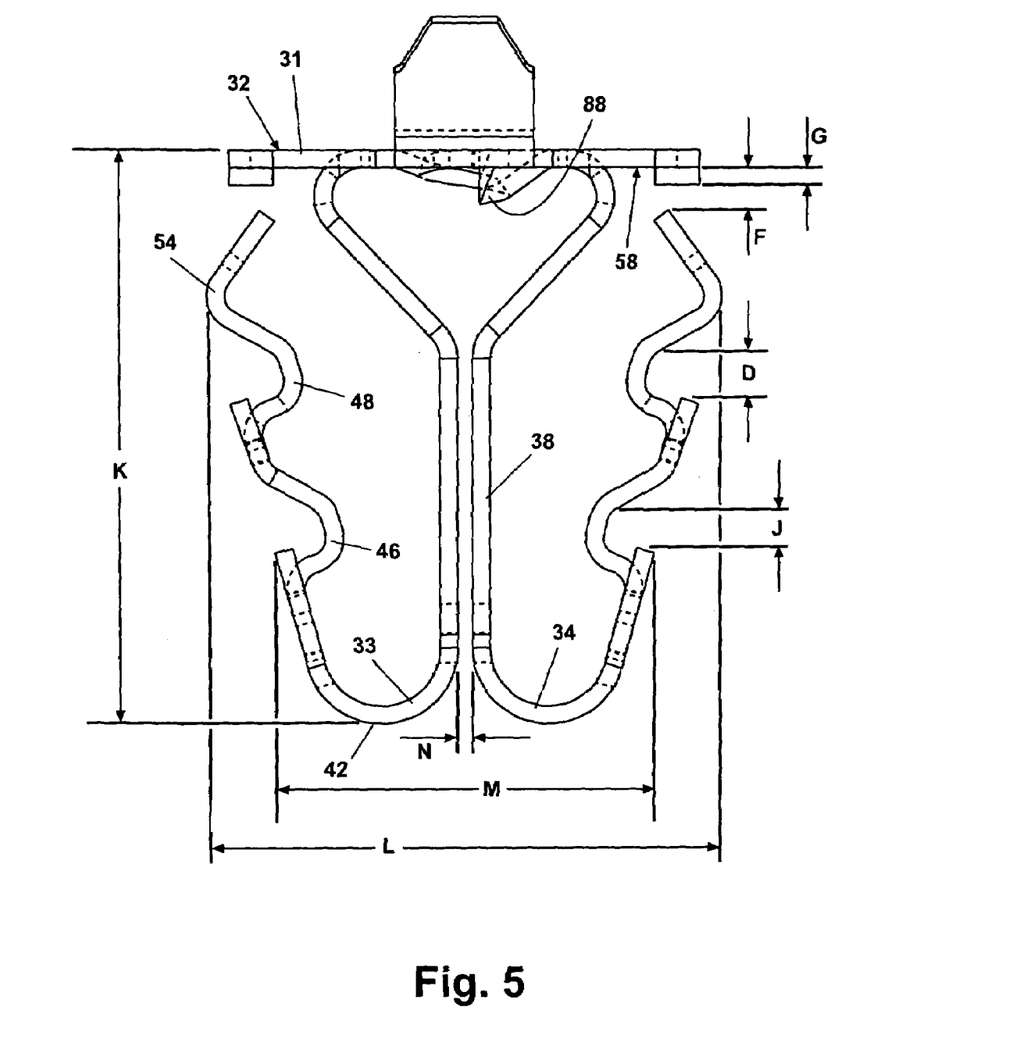
FIG. 5 is an elevational view of the fastener of FIG. 1.

Referring now to FIG. 5, separation distance "D", clearance dimension "F", compression distance "G" and clearance distance "J" are more clearly shown. A total fitting height "K" is measured between plate first surface 32 of fastener plate 31 and a distal point of U-shaped distal end 42. In a preferred embodiment of the present invention, fitting height "K" is approximately 19.8 mm. A total width "L" of resilient fastener 10 is measurable across opposing peaks of convex arcuate sections 54 of both U-shaped members 33 and 34. In a preferred embodiment of the present invention, total width "L" is approximately 17.5 mm in a non-deflected condition. A span width "M" is provided in the non-deflected condition of resilient fastener 10 which is larger than a corresponding width of fastener engagement aperture 28. A clearance gap "N" between support legs 38 can result from manufacturing tolerances. In a preferred embodiment of the present invention, span width "M" is approximately 13.0 mm and a value for clearance gap "N" ranges between approximately 0 mm to 0.5 mm. Because of the arcuate shape of both first detent 46 and second detent 48, a range of panel thicknesses "E" can be accommodated by resilient fastener 10. In a preferred embodiment, a press form 88 is provided adjacent engagement aperture 36 which assists engagement of mechanical fastener 23.

Although only a detent first pair 66 and a detent second pair 68 are shown herein, it will be obvious to a person of skill in the art that additional detent pairs can also be provided by lengthening U-shaped members 33 and 34 accordingly. As will also be obvious to a person of skill in the art, stop members 50 and/or 52 can be eliminated from resilient fastener 10 of the present invention. If stop members 50 and/or 52 are eliminated, the generally concave shape of first detent 46 and second detent 48 provide the necessary holding force to vehicle body panel 27. Resilient fasteners 10 of the present invention can also be coated with a scratch resisting material such as a polymeric material to reduce the possibility of damaging a surface finish of vehicle body panel 27 when resilient fastener 10 is either inserted or removed from fastener engagement aperture 28. As few as two resilient fasteners 10 can be used to temporarily support an installation assembly 12 during construction of an automobile vehicle. Reducing the quantity of resilient fasteners 10 used simplifies installation by requiring alignment of fewer fasteners.

Resilient fastener 10 of the present invention offers additional advantages. Resilient fastener 10 provides a relatively low installation force and a relatively high pullout or removal force. Resilient fastener 10 provides an increased flexible wing length to accommodate additional panel thickness due to foam or sound/vibration damping material. Furthermore, resilient fastener 10 of the present invention provides flexible wings having multiple detents to secure components or structures to one another in a manner which allows an item such as a panel to be temporarily mounted to a vehicle to promote a hands-free use of a fastener engagement tool to complete the panel installation.

The description of the invention is merely exemplary in nature and, thus, variations that do not depart from the gist of the invention are intended to be within the scope of the invention. Such variations are not to be regarded as a departure from the spirit and scope of the invention. Such variations can include stamped or formed extensions, or arcuate or substantially circular extensions to replace tabs 22 or compression elements 60, 62, 64, and 65. The arcuate shape of the detents can be replaced by partial polygonal or triangular shaped detents. Stop members 50, 52 can also be replaced with bight type or rounded members.

What is claimed is:

1. A fastener, comprising:
 a fastener plate;
 a substantially parallel pair of elastically displaceable elements defining a substantially mirror image configuration of displaceable elements extending from the fastener plate, each of the displaceable elements including a plurality of panel engaging detents sequentially spaced away from the fastener plate, the detents configured to individually and sequentially releasably engage a panel when the displaceable elements are inserted in an installation direction into a mounting aperture of the panel;
at least one tab connected to the fastener plate and extendable opposite to the displaceable elements, the at least one tab defining an anti-rotation feature; and
individual ones of the detents of a first one of the pair of displaceable elements being alignable opposite to corresponding ones of the detents of a second one of the pair of displaceable elements defining a plurality of detent pairs;
wherein the detent pairs define a plurality of temporary retention positions of the fastener as each detent pair is sequentially engaged with a boundary portion of the mounting aperture.

2. The fastener of claim 1, wherein each of the displaceable elements defines a substantially U-shaped member having a connecting end integrally joined to the fastener plate and a free end positioned approximate the connecting end.

3. The fastener of claim 1, wherein the displaceable elements extend substantially transverse to a plane of the fastener plate.

4. The fastener of claim 1, comprising a receiving aperture in the fastener plate adapted to receive a fastening element.

5. A fastener, comprising:
a fastener plate;
a substantially parallel pair of elastically displaceable elements defining a substantially mirror image configuration of displaceable elements extending from the fastener plate, each of the displaceable elements including a plurality of panel engaging detents sequentially spaced away from the fastener plate, the detents configured to individually and sequentially releasably engage a panel when the displaceable elements are inserted in an installation direction into a mounting aperture of the panel:
at least one tab connected to the fastener plate and extendable opposite to the displaceable elements, the at least one tab defining an anti-rotation feature;
each of the displaceable elements defines a substantially U-shaped member having a connecting end integrally joined to the fastener plate and a free end positioned approximate the connecting end;
each of the displaceable elements further includes:
a support leg extendable from the connecting end;
a detent portion integrally connected between the support leg and the free end; and
a convex-shaped arcuate section positioned adjacent the free end, the arcuate section defining a final retention position;
wherein each of the plurality of detents and the arcuate section is operably created in the detent portion using a full thickness of the detent portion.

6. A fastener, comprising:
a fastener plate;
a substantially parallel pair of elastically displaceable elements defining a substantially mirror image configuration of displaceable elements extending from the fastener plate, each of the displaceable elements including a plurality of panel engaging detents configured to releasably engage a panel when the displaceable elements are inserted into a mounting aperture of the panel;
each of the displaceable elements defining a substantially U-shaped member having a connecting end integrally joined to the fastener plate and a free end positioned approximate the connecting end;
at least one tab connected to the fastener plate and extendable opposite to the displaceable elements, the at least one tab defining an anti-rotation feature; and a panel engagement surface of the fastener plate facing the displaceable elements;
wherein the free end of each of the U-shaped members is spatially separable from the panel engagement surface by a distance approximately equal to a thickness of the panel.

7. The fastener of claim 6, wherein the panel is engageable between the panel engagement surface and the free end of each of the displaceable elements defining a final retention position of the fastener.

8. A fastener, comprising:
a fastener plate;
a substantially parallel pair of elastically displaceable elements defining a substantially mirror image configuration of displaceable elements extending from the fastener plate, each of the displaceable elements including a plurality of panel engaging detents configured to releasably engage a panel when the displaceable elements are inserted into a mounting aperture of the panel;
at least one tab connected to the fastener plate and extendable opposite to the displaceable elements, the at least one tab defining an anti-rotation feature;
individual ones of the detents of a first one of the pair of displaceable elements being alignable opposite to corresponding ones of the detents of a second one of the pair of displaceable elements defining a plurality of detent pairs, the detent pairs defining a plurality of temporary retention positions of the fastener when engaged with a boundary portion of the mounting aperture; and
a plurality of stop members operable to engage the panel in the temporary retention positions.

9. The fastener of claim 8, wherein the plurality of stop members further comprises a plurality of pairs of stop members, each pair positioned adjacent one of the detents.

10. A retainer, comprising:
a base plate having first and second sides;
a first substantially U-shaped deflectable wing extending from the first side of the base plate;
a second substantially U-shaped deflectable wing extending from the first side of the base plate and positioned substantially parallel to the first deflectable wing;
a first plurality of detents positionable on the first deflectable wing;
a second plurality of detents positionable on the second deflectable wing;
a plurality of detent pairs defining opposing ones of the first and second plurality of detents;
at least one tab defining a portion of the base plate extendable from the second side of the base plate;
wherein each of the first and the second deflectable wings further include:
a first leg integrally connectable to the base plate and extendable away from the base plate;
a U-shaped return section; and
a second leg integrally connectable to the U-shaped return section on a first end and a freely extending second end.

11. A fastener, comprising:
a fastener plate;

a substantially parallel pair of elastically displaceable elements defining a substantially mirror image configuration of displaceable elements extending from the fastener plate, each of the displaceable elements including a plurality of panel engaging detents sequentially spaced away from the fastener plate, the detents configured to individually and sequentially releasably engage a panel when the displaceable elements are inserted in an installation direction into a mounting aperture of the panel;

at least one tab connected to the fastener plate and extendable opposite to the displaceable elements, the at least one tab defining an anti-rotation feature;

the at least one tab defining a first formed portion of the fastener plate; and at least one compression element defining a second formed portion of the fastener plate, the at least one compression element extendable from the fastener plate toward the displaceable elements and operable to elastically bias the panel.

12. A retainer, comprising:

a base plate having first and second sides;

a first substantially U-shaped deflectable wing extending from the first side of the base plate;

a second substantially U-shaped deflectable wing extending from the first side of the base plate and positioned substantially parallel to the first deflectable wing;

a first plurality of detents positionable on an outwardly facing portion of the first deflectable wing and sequentially spaced from each other with respect to the base plate;

a second plurality of detents positionable on an outwardly facing portion of the second deflectable wing and sequentially spaced from each other with respect to the base plate;

a plurality of detent pairs defining opposing ones of the first and second plurality of detents; and at least one tab defining a portion of the base plate extendable from the second side of the base plate;

wherein each of the first and second U-shaped deflectable wings include a support leg integrally connected to and extending substantially transversely from the base plate, a U-shaped member positioned distally from the base plate, and a detent portion having one of the first and second plurality of detents created thereon, integrally connected to the U-shaped member, the detent portion directed toward the base plate by the U-shaped member.

13. The retainer of claim 12, wherein the detent portions of the first and second defectable wings are elastically deflectable at least toward each other.

14. The retainer of claim 12, wherein the retainer comprises a spring steel material.

15. The retainer of claim 12, wherein the retainer comprises a metal material.

16. The retainer of claim 12, wherein the retainer comprises at least one polymeric material.

17. A retainer, comprising:

a base plate having first and second sides;

a first substantially U-shaped deflectable wing extending from the first side of the base plate;

a second substantially U-shaped deflectable wing extending from the first side of the base plate and positioned substantially parallel to the first deflectable wing;

a first plurality of detents positionable on the first deflectable wing;

a second plurality of detents positionable on the second deflectable wing;

a plurality of detent pairs defining opposing ones of the first and second plurality of detents;

at least one tab defining a portion of the base plate extendable from the second side of the base plate; and a pair of stop elements disposed adjacent to each detent of each of the first and second plurality of detents.

18. The retainer of claim 17, wherein: each of the detents of both the first and second plurality of detents define a concave-shape; and each of the detents of the first plurality of detents face opposite to each of the detents of the second plurality of detents.

* * * * *